United States Patent
Suzuki et al.

(10) Patent No.: US 9,621,008 B2
(45) Date of Patent: Apr. 11, 2017

(54) SMALL POWER GENERATOR AND PORTABLE ELECTRONIC APPARATUS

(75) Inventors: Makoto Suzuki, Chiba (JP); Fumiharu Iwasaki, Chiba (JP); Jun Shinohara, Chiba (JP); Shinji Kinoshia, Chiba (JP); Toru Ozaki, Chiba (JP); Norimasa Yanase, Chiba (JP)

(73) Assignee: SEIKO INSTRUMENTS INC. (JP)

(*) Notice: Subject to any disclaimer, the term of this patent is extended or adjusted under 35 U.S.C. 154(b) by 600 days.

(21) Appl. No.: 14/117,906

(22) PCT Filed: Feb. 17, 2012

(86) PCT No.: PCT/JP2012/053873
§ 371 (c)(1),
(2), (4) Date: Dec. 9, 2013

(87) PCT Pub. No.: WO2012/157305
PCT Pub. Date: Nov. 22, 2012

(65) Prior Publication Data
US 2014/0091659 A1    Apr. 3, 2014

(30) Foreign Application Priority Data
May 18, 2011   (JP) .................. 2011-111443

(51) Int. Cl.
*H02K 7/116*    (2006.01)
*H02K 7/18*    (2006.01)
(Continued)

(52) U.S. Cl.
CPC ........... *H02K 7/116* (2013.01); *H02K 7/1861* (2013.01); *H01M 10/44* (2013.01); *H01M 10/46* (2013.01);
(Continued)

(58) Field of Classification Search
CPC .......... H01M 10/44; H01M 10/46; H02J 7/32; H02K 7/116; H02K 7/1861; H04M 19/08; Y02B 40/90
(Continued)

(56) References Cited

U.S. PATENT DOCUMENTS

2006/0250043 A1* 11/2006 Chung ................ H02K 5/08
                                                310/216.004
2008/0180001 A1* 7/2008 Dai ................... H02K 7/1861
                                                310/75 B
(Continued)

FOREIGN PATENT DOCUMENTS

CN    2496176 Y  *  6/2002
JP    07209446 A  *  8/1995

OTHER PUBLICATIONS

Translation of foreign document CN 2496176 Y (Year: 2002).*
(Continued)

*Primary Examiner* — Alex W Mok
(74) *Attorney, Agent, or Firm* — Adams & Wilks

(57) ABSTRACT

A power generator has a power generation unit for generating electric power, a rotary unit and a power transmission unit. The power generation unit includes a stator having a stator core and a rotor disposed in the stator. The rotor has a rotor shaft and a driven gear disposed on the rotor shaft and is configured to be driven to rotate the rotor shaft. The rotary unit has a driving gear for undergoing rotational movement to rotate the rotor shaft via the driven gear to generate electric power. The power transmission unit has an intermediate gear for transmitting a rotational force of the driving gear of the rotary unit to the driven gear of the rotor shaft. The intermediate gear has at least one rotary shaft disposed inside of the stator core.

17 Claims, 13 Drawing Sheets

(51) Int. Cl.
*H01M 10/44* (2006.01)
*H01M 10/46* (2006.01)
*H04M 19/08* (2006.01)
*H02J 7/32* (2006.01)

(52) U.S. Cl.
CPC ............... *H02J 7/32* (2013.01); *H04M 19/08* (2013.01); *Y02B 40/90* (2013.01)

(58) Field of Classification Search
USPC .......................................................... 310/83
See application file for complete search history.

(56) References Cited

U.S. PATENT DOCUMENTS

| | | | |
|---|---|---|---|
| 2009/0072645 A1 | 3/2009 | Quere | ............................ 310/114 |
| 2010/0171384 A1* | 7/2010 | Elmaleh | ............... B60K 7/0007 310/156.43 |
| 2010/0230976 A1 | 9/2010 | Chou | ............................ 290/1 C |
| 2011/0072926 A1* | 3/2011 | Yang | ...................... H02K 7/116 74/413 |
| 2015/0372561 A1* | 12/2015 | Chen | ...................... A63H 30/04 310/83 |

OTHER PUBLICATIONS

Translation of foreign document JP 07209446 A (Year: 1995).*
English translation of First Notification of Examination Opinion mailed Jun. 1, 2015 issued in Chinese Patent Appln. No. 201280023882.2.
International Search Report mailed Apr. 17, 2012 issued in International Appln. No. PCT/JP2012/053873.
Patent Abstracts of Japan, Publication No. 10-164771, Publication date Jun. 19, 1998.
Patent Abstracts of Japan, Publication No. 10-322428, Publication date Dec. 4, 1998.
European Search Report mailed Apr. 1, 2016 issued in Application No. EP 12 78 5758.

* cited by examiner

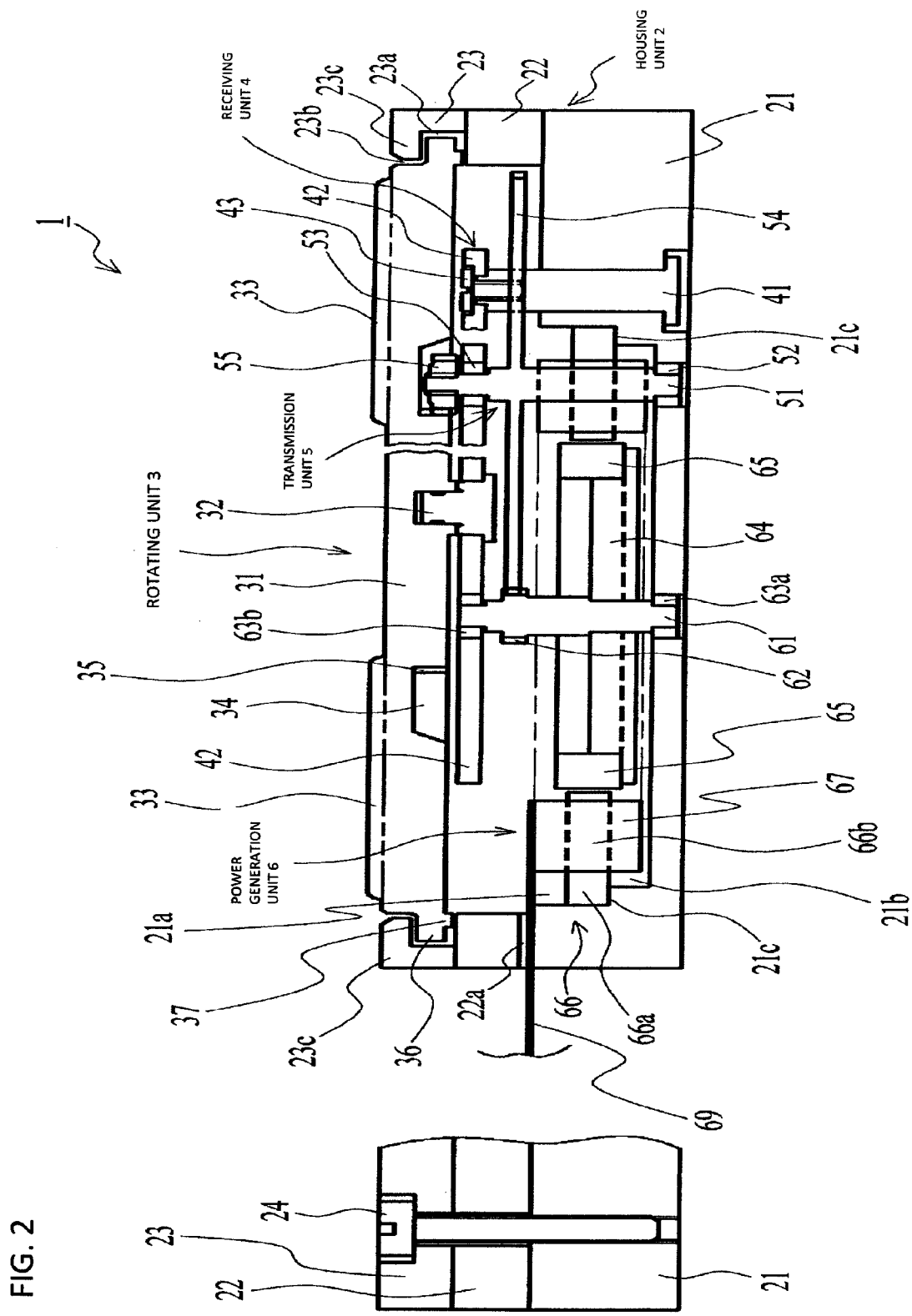

HOUSING UNIT 2

ROTATING UNIT 3

RECEIVING UNIT 4

TRANSMISSION UNIT 5

POWER GENERATION UNIT 6

FIG. 7(a) 4 SLOTS (4 POLES)
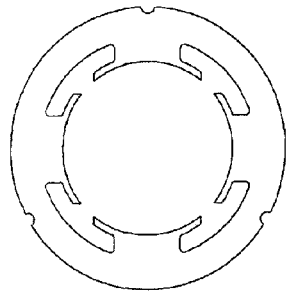
FIG. 7(b) 6 SLOTS (6 POLES)
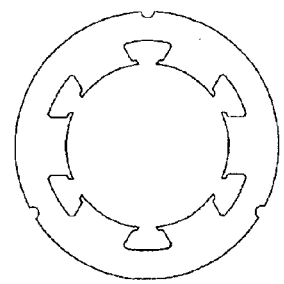
FIG. 7(c) 8 SLOTS (8POLES)
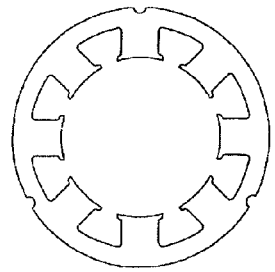
FIG. 7(d) 10 SLOTS (10 POLES)
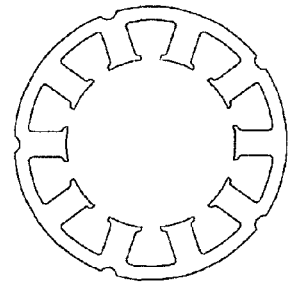
FIG. 7(e) 12 SLOTS (12 POLES)
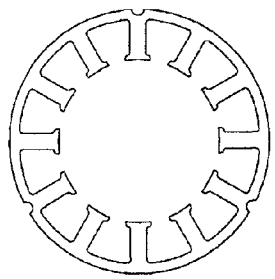
FIG. 7(f) 14 SLOTS (14 POLES)
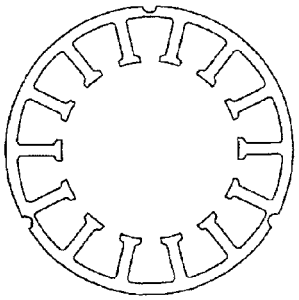
FIG. 7(g) 16 SLOTS (16 POLES)
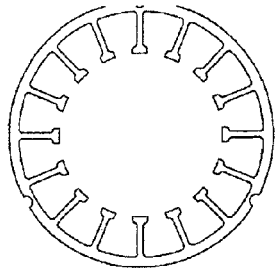

| NUMBER OF POLES | PRODUCT THICKNESS [mm] | INNER DIAMETER OF CORE [mm] | OUTER DIAMETER OF CORE [mm] | POWER [W/5000rpm] |
|---|---|---|---|---|
| 4 | 1 | 13 | 22 | 0.036 |
| 6 | 1 | 13 | 22 | 0.048 |
| 8 | 1 | 13 | 22 | 0.124 |
| 10 | 1 | 13 | 22 | 0.188 |
| 12 | 1 | 13 | 22 | 0.078 |
| 14 | 1 | 13 | 22 | 0.062 |
| 16 | 1 | 13 | 22 | 0.050 |

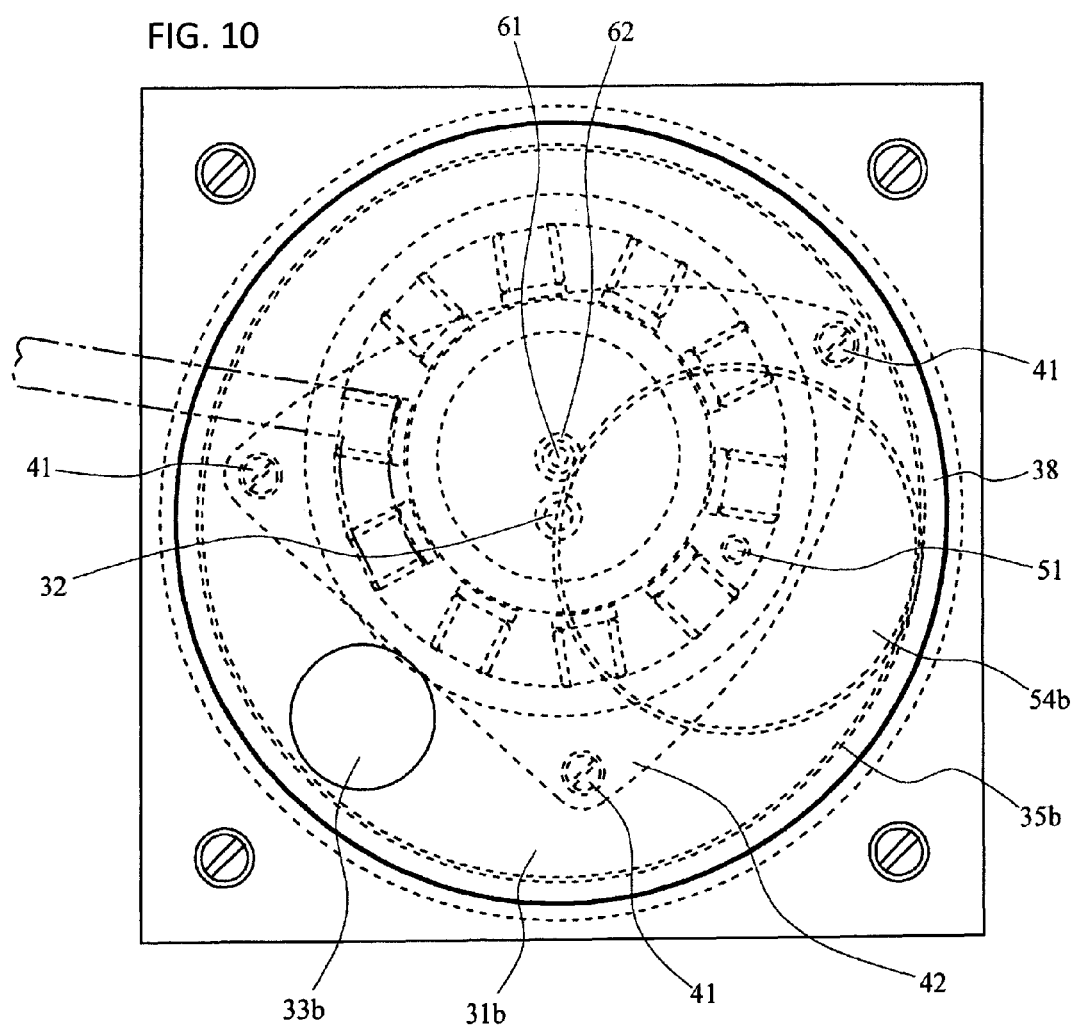

1

SMALL POWER GENERATOR AND PORTABLE ELECTRONIC APPARATUS

BACKGROUND OF THE INVENTION

Technical Field

The present invention relates to a small power generator and a portable electronic apparatus, for example, relates to a small power generator that generates electric power by manual rotation.

Background Art

Various portable electronic apparatuses, such as wireless communication apparatuses including a mobile phone to make calls or send e-mails using a wireless communication function or reproduction apparatuses that reproduce stored music data or display character information, are widely used. All of these portable electronic apparatuses include a battery, and wireless communication or reproduction processing is performed by the electric power from the battery.

Therefore, in general, the portable electronic apparatus is used in a state where the battery is charged by being connected to the household power supply or used in a state where a small battery as a spare external power supply is connected thereto. In any case, however, there is a problem in that communication is not possible when power consumption at the outside increases and the electric power of a predetermined level or more has been used.

In order to solve this problem, a mobile phone including a small power generator (PTL 1) or a portable hand generator connectable to a mobile phone and the like (PTL 2) has been proposed.

However, a sufficient amount of power generation for use in portable electronic apparatuses cannot be obtained from the power generators that have been proposed. In addition, the power generators that have been proposed are not sufficiently small and thin.

CITATION LIST

Patent Literature

[PTL 1] JP-A-10-190793
[PTL 2] JP-A-2001-136707

SUMMARY OF THE INVENTION

It is an object of the present invention to provide a small power generator, which has a sufficient power generation capacity to use a predetermined function, and to a portable electronic apparatus equipped with the small power generator.

(1) According to one aspect of the present invention, there is provided an inner rotor type small power generator including: a circular stator including a plurality of core windings; a rotor that includes a rotor shaft, in which a driven gear is disposed, and a circular permanent magnet and that is disposed inside the stator; a rotating unit that includes a driving gear and that is rotated by a user at the time of power generation; and a transmission unit that transmits rotation of the driving gear, which is caused by the rotation of the rotating unit, to the driven gear of the rotor shaft through an intermediate gear. At least one rotary shaft of the intermediate gear is disposed outside the rotor within the stator.

(2) In the small power generator according to (1) above, at least one rotary shaft of the intermediate gear is disposed between the core windings of the rotor.

(3) In the small power generator according to (1) or (2) above, a receiving plate disposed between the rotating unit and the stator is further provided and a rotary shaft of the driving gear, at least one rotary shaft of the intermediate gear, and the rotor shaft are supported on the receiving plate.

(4) In the small power generator according to (3) above, the rotating unit includes a rotary dial which is disposed in parallel with the stator and in which a circular recess, which is formed concentrically with the driving gear, is formed, and the driving gear is an external gear formed on an inner peripheral surface of an inner side of the circular recess.

(5) In the small power generator according to (3) above, the rotating unit includes a rotary dial which is disposed in parallel with the stator and in which a circular recess, which is formed concentrically with the driving gear, is formed, and the driving gear is an internal gear formed on the circular recess.

(6) In the small power generator according to (4) or (5) above, the stator, the rotor, and the transmission unit are disposed on a more inner side than an outer diameter of the rotary dial.

(7) According to another aspect of the present invention, there is provided a portable electronic apparatus including: the small power generator according to any one of to (1) to (6) above; and storage means for storing electric power generated by the small power generator.

According to the present invention, in the inner rotor type small power generator, at least one rotary shaft of the intermediate gear for transmitting the rotation of the driving gear to the driven gear is disposed outside the rotor within the stator. Therefore, it is possible to provide a small power generator having a sufficient power generation capacity to use a predetermined function.

BRIEF DESCRIPTION OF DRAWINGS

FIG. 2 is a cross-sectional view of a small power generator.

FIG. 7 is an explanatory diagram showing the shape of a stator core when the number of poles is changed.

FIG. 10 is an explanatory diagram of a state when the small power generator in the second embodiment is viewed from the front.

DETAILED DESCRIPTION OF THE INVENTION

Hereinafter, preferred embodiments of a small power generator and a portable electronic apparatus of the present invention will be described in detail with reference to FIGS. 1 to 13.

(1) Overview of Embodiment

Figure 1A:
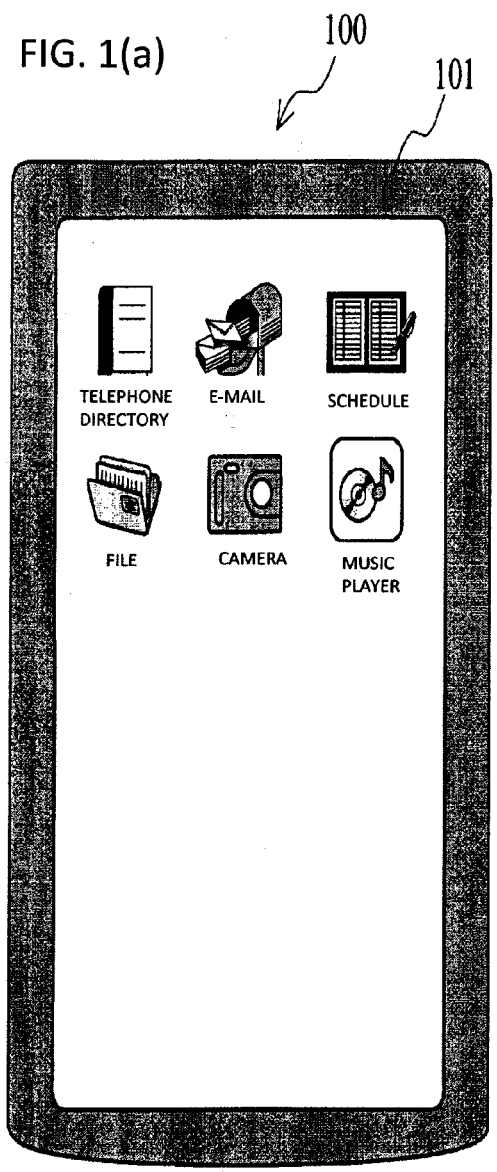
FIG. 1 is a diagram showing the configuration of the appearance of a mobile phone in which a small power generator is mounted.
Figure 1B:
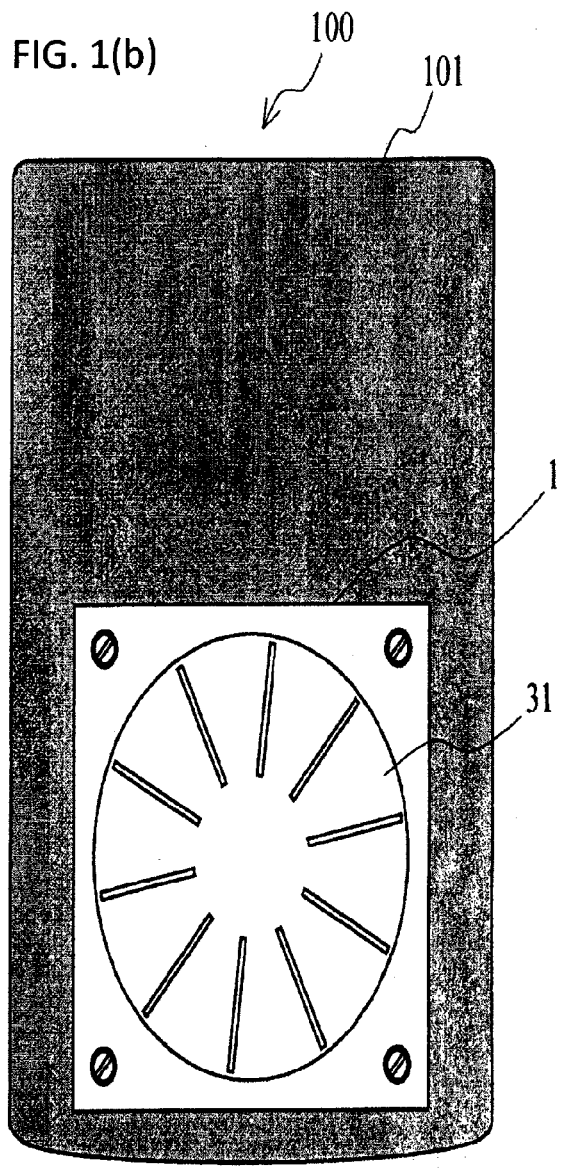
Figure 1C:
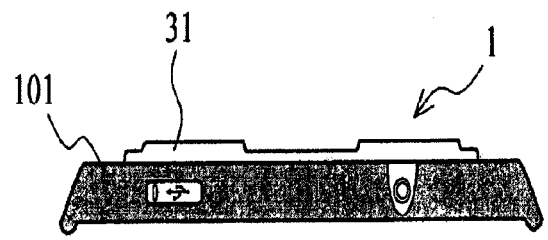

FIG. 1 is a diagram showing the configuration of the appearance of a mobile phone (portable electronic apparatus) 100 in which a small power generator 1 is mounted. As shown in FIG. 1, in the case of the portable electronic apparatus 100 in which a display unit or an operation unit is disposed on the entire surface as smart phones, the small power generator 1 is mainly disposed on the back surface of a housing 101.

In the small power generator 1, a rotary dial 31 is disposed in the middle of the surface, and the rotary dial 31 can be turned by hands or fingers put on a plurality of rotary dial protrusions 33 radially formed on the surface.

By turning the rotary dial 31, a rotor of an inner rotor type power generation unit 6, which is disposed inside the small power generator 1, is rotated by the rotational force through at least one intermediate gear. As a result, electric power is generated to charge the power supply for the portable electronic apparatus 100 or charge the spare power supply (for example, a secondary battery or a large-capacity capacitor).

By rotating the rotary dial 31 about 1 minute, the small power generator 1 can generate electric power to the extent that the standby state (monitoring of incoming calls or e-mails and incoming call processing when there is an incoming call) can be maintained for 10 minutes in the case of a mobile phone although this depends on the ratio of the gear for transmitting rotational power or the size of the small power generator 1. That is, by the rotation of the rotary dial 31, a permanent magnet 65 of the rotor portion is rotated at 3000 rpm to 7000rpm. By this rotational speed, it is possible to supply a voltage of 3 V to 5 V and a sufficient current for charging.

The small power generator 1 of the present embodiment is formed in the size of 3 square centimeters to 5 square centimeters and 6 mm to 10 mm in thickness, and accordingly miniaturization and small thickness are realized.

In addition, as a configuration for miniaturization and small thickness, the small power generator 1 includes an intermediate gear in order to transmit the rotational force of the rotary dial 31 to a rotating unit 3, and at least one of the shafts of the intermediate gear is provided between a plurality of core windings 67 circularly disposed in a stator core 66 of the power generation unit 6. Thus, in the present embodiment, the planar size is reduced by providing the shaft of the intermediate gear inside the stator core of the inner rotor type power generator.

In addition, since all components (receiving unit 4 for supporting the rotary shaft, a transmission unit 5 for transmission of rotation, and the power generation unit 6) required for power generation are disposed on a more inner side than the outer diameter (outer periphery) of the rotary dial 31, the planar size can be reduced.

In addition, since a dial shaft 32 of the rotary dial 31 and a rotor shaft 61 of the power generation unit 6 are not disposed on the same axis but disposed so as to be shifted from each other in a plane (disposed so as to be spaced apart from each other), both the shafts can be supported by a common receiving plate 42. Therefore, it is possible to reduce the overall thickness.

(2) Details of Embodiment

FIG. 2 is a cross-sectional view taken along each axis of the small power generator 1 in a first embodiment.

In FIG. 3, in order to clarify the location of each unit that forms the small power generator, a corresponding location in FIG. 2 is painted in black.

FIG. 4 shows a state (a) when a small power generator is viewed from the front and a state (b) where a rotating unit is removed.

As shown in FIGS. 2 and 3, the small power generator 1 is configured to include a housing unit 2, the rotating unit 3, the receiving unit 4, the transmission unit 5, and the power generation unit 6.

As shown in FIG. 4, the small power generator 1 is formed in a rectangular shape of 3 cm to 5 cm, and four corners are fixed by screws 24.

In addition, in the cross-sectional view shown in FIG. 2, a cross-section along the broken line passing through each axis is shown (diagram on the right side), and a state screwed by the screw 24 is shown in a diagram on the left side.

Figure 3A:
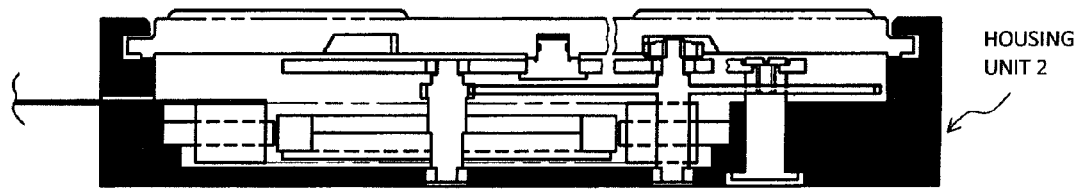
FIG. 3 is an explanatory diagram for the corresponding location of each unit in the cross-sectional view of a small power generator.

As shown in FIG. 3(a), the housing unit 2 is a housing in which each of the rotating unit 3 to the power generation unit 6 of the small power generator 1 is housed.

The housing unit 2 is configured to include a base 21, an intermediate plate 22, a cover 23, and the screw 24 for fixing these. The base 21, the intermediate plate 22, and the cover 23 have the same rectangular shape. In four corners of each of the base 21, the intermediate plate 22, and the cover 23, screw holes for fixing with the screw 24 are formed at positions where the central axes are the same.

In the base 21, a bearing hole for pivotally (rotatably) supporting the rotor shaft 61 passes through a position shifted from the center (intersection of diagonals).

In addition, since the dial shaft 32 of the rotary dial 31 is disposed at the center of the base 21, the dial shaft 32 and the rotor shaft 61 are disposed at positions shifted from each other. Therefore, since both the shafts 32 and 61 can be pivotally (rotatably) supported on the same plane using the common receiving plate 42, it is possible to reduce the thickness.

A first recess 21a, which has a circular shape having a radius r1 with a bearing hole for the rotor shaft 61 as the center, is formed in the base 21, and a second recess 21b, which has a radius r2 (<r1) with the same bearing hole as the center, is further formed below the first recess 21a.

A housing portion of the power generation unit 6 is formed by the first and second recesses 21a and 21b.

In addition, a circular base step portion 21c is formed by the bottom surface of the first recess 21a and the peripheral surface of the second recess 21b, and the stator core 66 is placed on the base step portion 21c.

In addition, on the circular bottom surface formed in the second recess 21b, a bearing hole for pivotally (rotatably) supporting a transmission shaft 51, which is a shaft of the intermediate gear, passes through a position at a predetermined distance in a central direction from the inner peripheral surface.

Figure 5A:
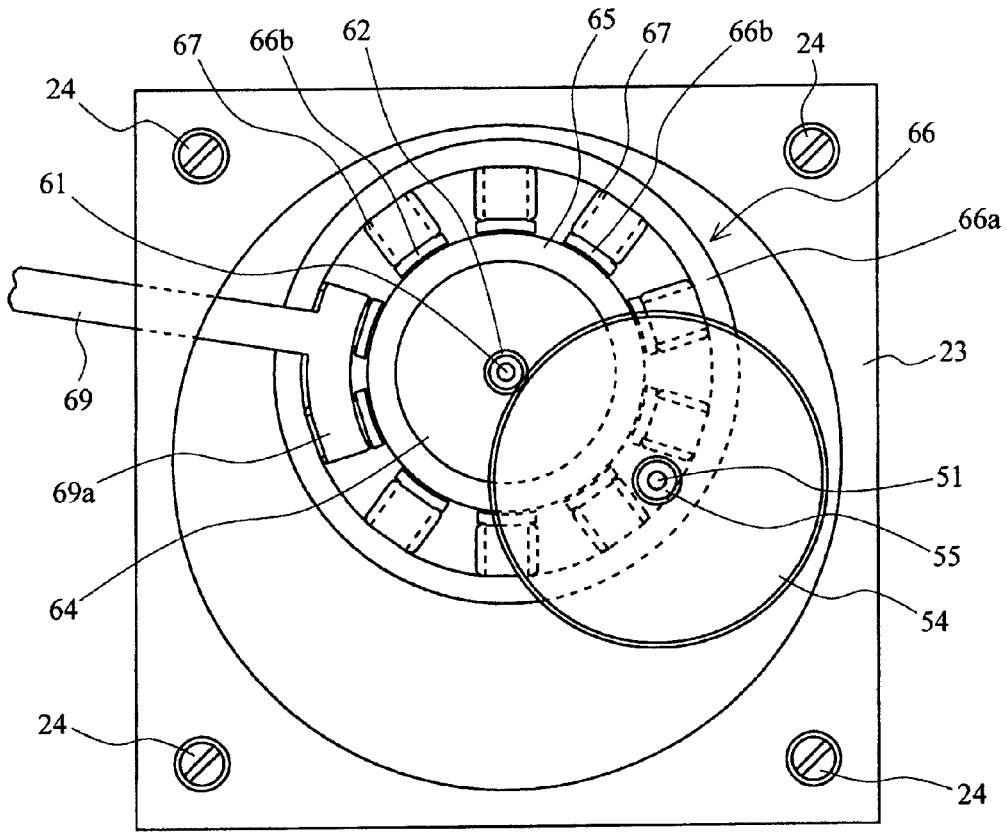
FIG. 5 is an explanatory diagram of a state where a rotating unit and a receiving unit are removed when a small power generator is viewed from the front.

Then, since the transmission shaft 51 is disposed between the core windings 67 of the stator core 66 (inside the stator core 66), it is possible to reduce the planar size of the small power generator 1 (refer to FIG. 5(a)).

Figure 5B:
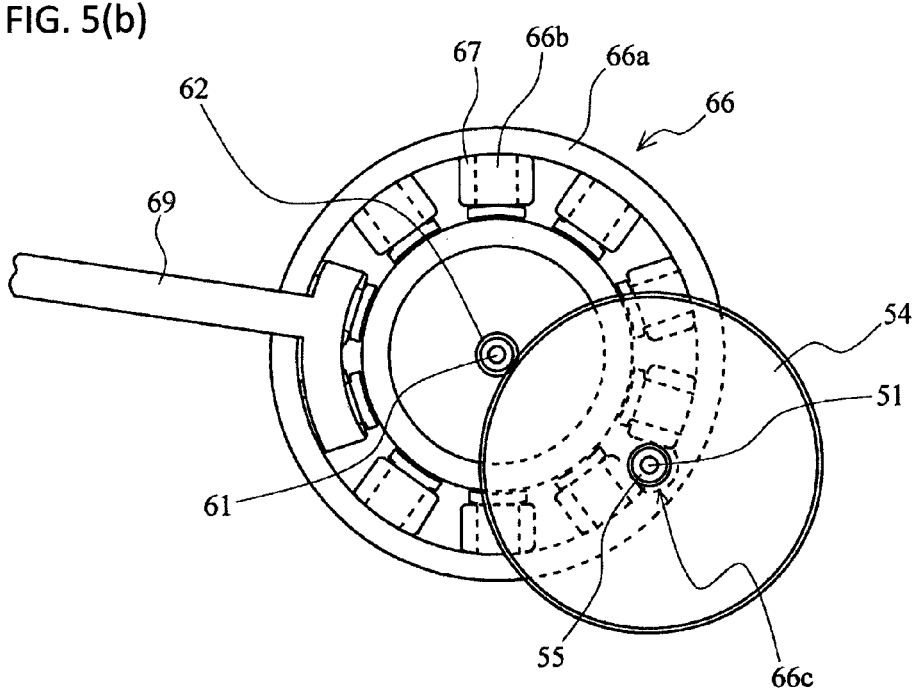

In addition, as shown in FIG. 5(b), it is possible to provide a cutout portion 66c by cutting a part of the inside of a circular portion 66a away and dispose the transmission shaft 51 such that a part of the transmission shaft 51 fits into the cutout portion 66c.

In addition, although not shown in the diagrams, when the diameter of the transmission shaft 51 is smaller than the width of the circular portion 66a, it is also possible to provide a through hole of the transmission shaft 51 in the circular portion 66a and dispose the transmission shaft 51, which passes through the through hole, in the base 21. In this case, the transmission shaft 51 is pivotally supported by an oil-retaining bearing 52 disposed in the base step portion 21c of the base 21.

In addition, the transmission shaft 51 may be disposed on the circular portion 66a by providing the oil-retaining bearing 52, which pivotally supports the transmission shaft 51, in the circular portion 66a.

Three strut holes for a strut 41 are formed in portions of the base 21 excluding the first recess 21a.

The intermediate plate 22 is disposed on the upper side where the first recess 21a of the base 21 is formed.

The intermediate plate 22 has a rectangular shape. At the center of the intermediate plate 22, a circular hole having a diameter slightly smaller than the maximum outer diameter of the rotary dial 31 is provided.

On a surface of the intermediate plate 22 that is in contact with the base 21, a through recess 22a penetrating to the outside from the inside of the circle diameter hole is provided. By the upper surface of the base 21 and the through recess 22a, a through hole penetrating from the inside to the outside is formed on the side surface of the housing unit 2.

A substrate 69 for extracting the electric power generated by the power generation unit 6 is disposed in the through recess 22a. Therefore, the depth of the through recess 22a is approximately the thickness of the substrate 69.

In addition, the intermediate plate 22 and the base 21 may be integrally formed, and the substrate 69 for extracting the generated electric power to the outside or a through hole, through which wiring lines pass, may be provided on the side surface or the bottom surface. In this case, a circular recess for the rotary dial 31 is further formed above the first recess 21a. The center of this circular recess is matched with the center of the rotary dial 31.

The cover 23 is disposed above the base 21.

The cover 23 has the same rectangular shape as the base 21 and the intermediate plate 22 when the small power generator 1 is produced as an independent product. However, for example, when the small power generator 1 is built in a portable electronic apparatus, such as a mobile phone, a smart phone, or a sound data reproduction apparatus, it is also possible to use a cover that forms a housing of the portable electronic apparatus.

The cover 23 is formed in a circular shape such that the cross-section has an inverted L shape, and is configured to include a circular portion that forms a pressing portion 23c and a peripheral wall portion erected in the outer periphery.

That is, a circular recess 23a having a diameter slightly larger than the maximum outer diameter of the rotary dial 31 is formed at the center of the cover 23. In addition, a circular dial hole 23b having a diameter slightly smaller than the maximum outer diameter of the rotary dial 31 is formed in the middle of the bottom surface of the circular recess 23a.

In addition, the pressing portion 23c for pressing the rotary dial 31 is formed by the remaining bottom portion of the recess 23a.

Figure 3B:
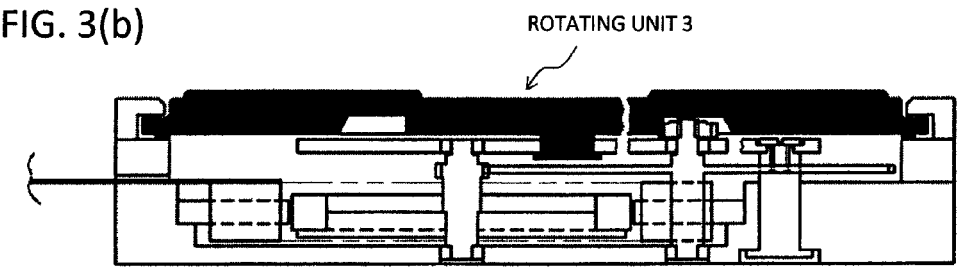

As shown in FIG. 3(b), the rotating unit 3 is a member that is disposed in the middle of the upper portion of the small power generator 1 and is used when a user performs a rotation operation to generate the electric power.

Figure 4A:
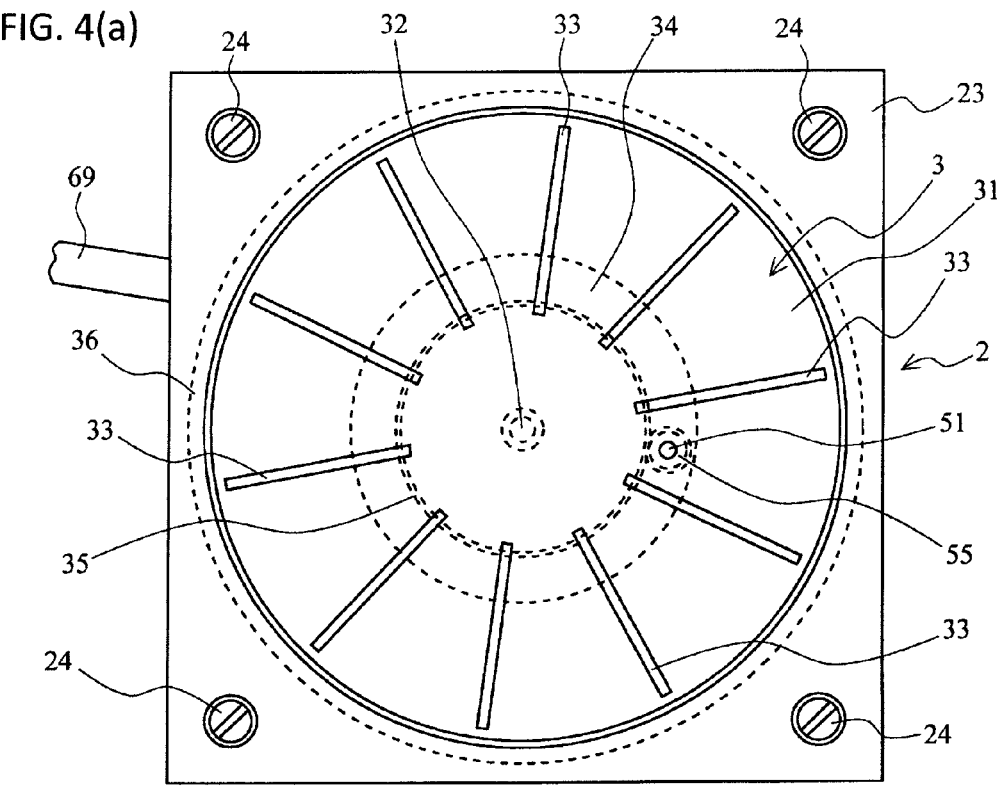
FIG. 4 is an explanatory diagram of a state (a) when a small power generator is viewed from the front and a state (b) where a rotating unit is removed.

The rotary dial protrusion 33 is formed on the upper surface of the rotating unit 3 so that a finger is put on the rotary dial protrusion 33 when the user performs a rotation operation. As shown in FIG. 4(a), a plurality of (in the present embodiment, 10) rotary dial protrusions 33 are radially provided.

In the present embodiment, since the strength of the rotary dial 31 can be increased by forming a plurality of rotary dial protrusions 33 radially, it is possible to form the rotary dial 31 to be thin.

A shaft hole for a sliding bearing is formed at the inside center of the rotating unit 3, and is pivotally supported by the dial shaft 32.

On the inner surface of the rotating unit 3, a circular recess 34 is formed concentrically with the shaft center of the dial shaft 32. A driving gear 35 is formed on the inner peripheral wall of the circular recess 34.

The driving gear 35 is integrally formed on the inner peripheral wall of the circular recess 34 by molding, sintering, and the like. However, the driving gear 35 that is separately formed in a ring shape may be fixed to the inner peripheral wall of the circular recess 34.

The rotational driving force of the rotary dial 31 is transmitted through the driving gear 35.

In a peripheral end portion of the rotating unit 3, a thin circular engaging portion 36 is formed over the entire periphery. The circular engaging portion 36 is covered by the pressing portion 23c of the cover 23 with a predetermined gap interposed therebetween so that the rotary dial 31 does not come off.

On the inner surface of the circular engaging portion 36, that is, on the outer peripheral side of the surface of the rotary dial 31 facing the base 21, a circular sliding protrusion 37 is formed over the entire periphery, and the sliding protrusion 37 is in contact with the intermediate plate 22. In addition, a contact portion of the sliding protrusion 37 and the intermediate plate 22 slide when the rotary dial 31 is rotated.

Thus, in the rotary dial 31, the center is supported by the receiving plate 42 on the dial shaft 32, and the outer peripheral side of the bottom surface facing the receiving plate 42 is supported by the intermediate plate 22. Therefore, since the strength of the rotary dial 31 can be increased, it is possible to form the rotary dial 31 to be thin.

Figure 3C:
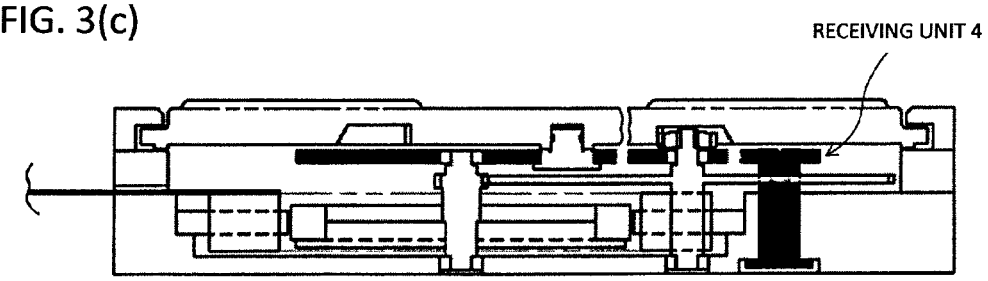

As shown in FIG. 3(c), the receiving unit 4 is a member that is disposed between the housing unit 2 and the rotating unit 3 and is for pivotally supporting each shaft (the dial shaft 32, the transmission shaft 51, and the rotor shaft 61) of the small power generator 1.

The receiving unit 4 is configured to include three struts 41, the receiving plate 42, and a screw 43.

As shown in FIG. 2, the struts 41 are fixed to three strut holes formed in the base 21.

Figure 4B:
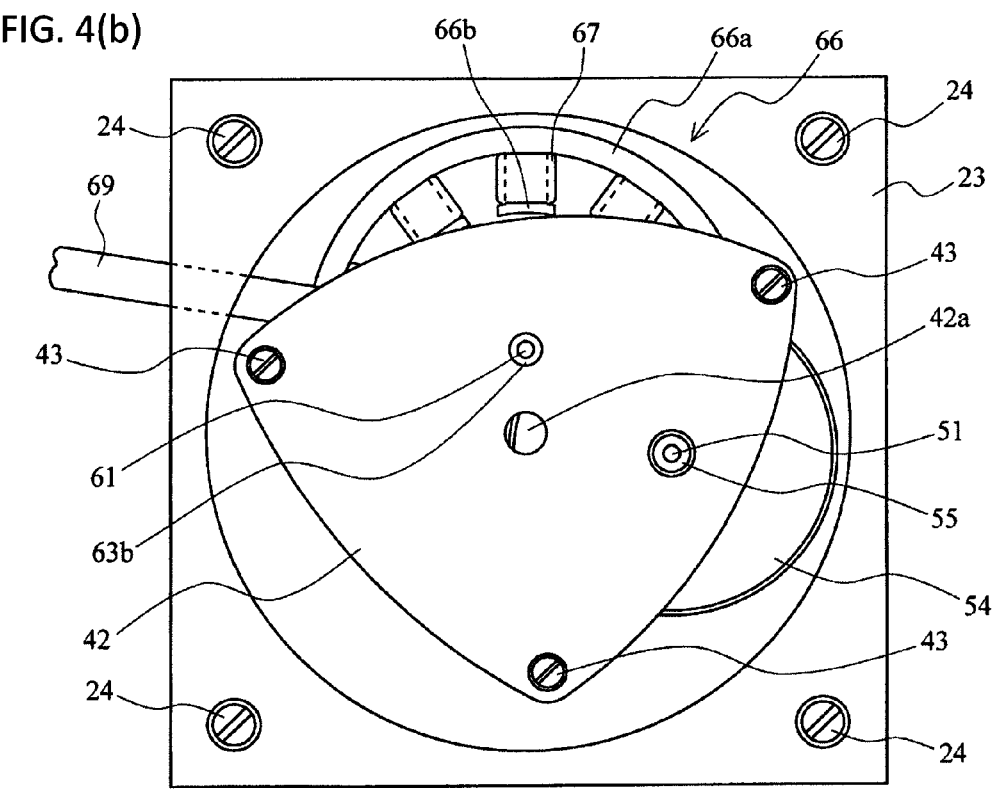

FIG. 4(b) shows a state where the rotary dial 31 is detached from a state shown in FIG. 4(a) when the small power generator 1 is viewed from the top. Three struts 41 are provided at positions, which do not overlap the receiving unit 4 and the transmission unit 5, in the base 21 on the inner side of the intermediate plate 22 (refer to the screw 43 attached to the strut 41 in FIG. 4(b)). Three struts 41 are disposed such that the shaft center of the dial shaft 32 is positioned at the approximately central portion of the three points. Accordingly, the three struts 41 can stably receive the force generated during the rotation of the rotary dial 31.

In addition, the strut 41 may be screwed to the base 21 by forming a screw on the outer peripheral surface of the strut 41.

At the other ends of the three struts 41 fixed to the base 21, the receiving plate 42 having an approximately triangular shape whose three sides are curved outward is disposed, and is fixed to the strut 41 by the screw 43.

A fixing hole 42a for the dial shaft 32, a shaft hole for the rotor shaft 61, and a shaft hole for the transmission shaft 51 are formed at corresponding positions in the receiving plate 42.

In addition, as shown in FIG. 2, since the dial shaft 32 is disposed upward from the receiving plate 42, and the rotor shaft 61 is disposed downward from the receiving plate 42, both the shafts can be fixed and pivotally supported on the same receiving plate 42. As a result, the small power generator 1 can be made thin.

In the dial shaft 32, the lower side of the bearing portion of the dial shaft 32 is fixed to the fixing hole portion by driving. However, the dial shaft 32 may be fixed by other methods, such as welding and screw fixing.

Figure 3D:
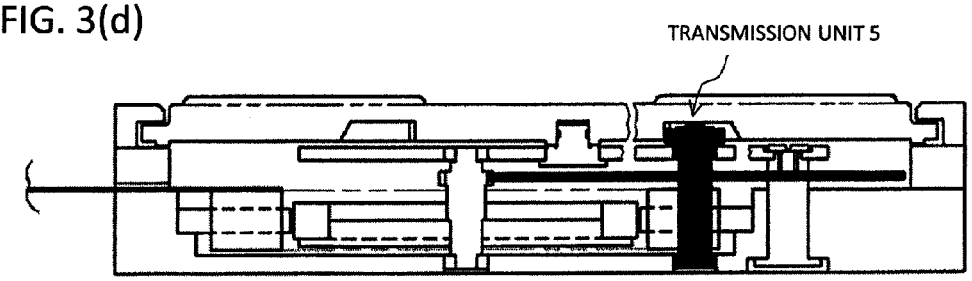

As shown in FIG. 3(d), the transmission unit 5 is a member for transmitting the rotation of the rotary dial 31 to the rotor shaft 61 of the power generation unit 6.

The transmission unit 5 is configured to include the transmission shaft 51, the oil-retaining bearing 52, an oil-retaining bearing 53, a second intermediate gear 54, and a first intermediate gear 55.

One end of the transmission shaft 51 is pivotally supported on the base 21 by the oil-retaining bearing 52, and the other end side is pivotally supported on the receiving plate 42 by the oil-retaining bearing 53.

As shown in FIGS. 2 and 4(b), the oil-retaining bearing 53 side of the transmission shaft 51 penetrates the receiving plate 42, and the first intermediate gear 55 is fixed to the end by spline or using a key and a groove.

The first intermediate gear 55 is located in the circular recess 34 of the rotary dial 31, and meshes with the driving gear 35 (refer to FIGS. 2 and 4(a)).

In addition, the second intermediate gear 54 is integrally formed between both the pivotally supported portions of the transmission shaft 51, and the second intermediate gear 54 meshes with a driven gear 62 formed on the rotor shaft 61 (refer to FIGS. 2 and 5(a)). In addition, the second intermediate gear 54 may be formed separately from the transmission shaft 51 and be attached to the transmission shaft 51 using a key and a groove or by spline.

Figure 3E:
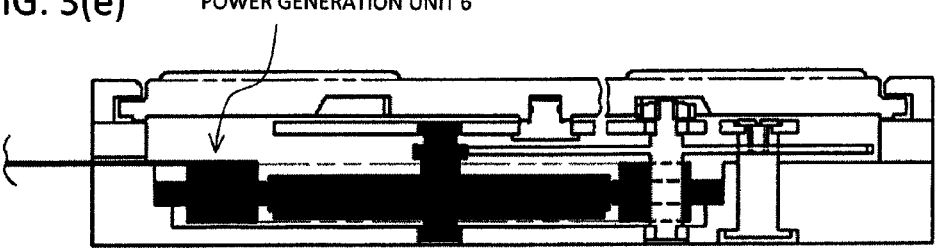

As shown in FIG. 3(e), the power generation unit 6 is a member that is housed in the housing unit 2 and generates electric power by receiving the rotational force of the rotary dial 31 through the transmission unit 5 and rotating a permanent magnet.

The power generation unit 6 is configured to include a rotor portion, a stator portion, and the substrate 69. The power generation unit 6 is a stator core and inner rotor type power generator, and the number of magnetic poles of the permanent magnet and the number of protruding poles of the stator core are the same 10.

Figure 6A:
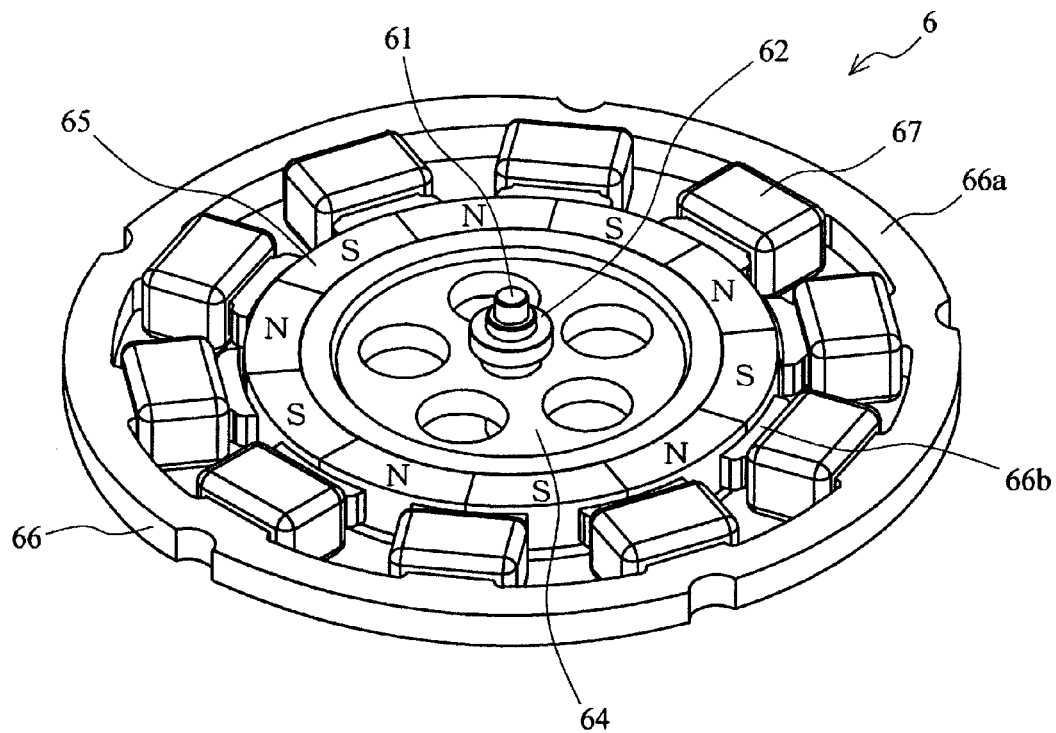
FIG. 6 is a perspective view of a power generation unit in a small power generator and a perspective view showing a magnetization state.

As shown in FIGS. 2 and 6(a), the rotor portion is configured to include the rotor shaft 61, the driven gear 62, oil-retaining bearings 63a and 63b, a magnetic holding member 64, and the permanent magnet 65. In addition, the stator portion is configured to include the stator core 66 and the core winding 67.

One end of the rotor shaft 61 is pivotally supported on the base 21 by the oil-retaining bearing 63a, and the other end is pivotally supported on the receiving plate 42 by the oil-retaining bearing 63b.

The driven gear 62 meshing with the second intermediate gear 54 is integrally formed on the outer peripheral surface of the rotor shaft 61 on the side of the receiving plate 42. The driven gear 62 may also be separately formed and be fixed to the rotor shaft 61 by spline or using a key and a groove.

The disc-shaped magnetic holding member 64 is attached to the base 21 side of the rotor shaft 61. In the magnetic holding member 64, a plurality (in FIG. 6(a), 5) of through holes are provided for weight reduction.

A step is formed on the outer peripheral edge of the magnetic holding member 64, and the ring-shaped permanent magnet 65 is fixed to the step portion.

The permanent magnet 65 may be integrally molded and sintered in a ring shape, or an individual magnet may be arranged in a ring shape for each magnetic pole. For the permanent magnet 65 of the present embodiment, a magnetic material in a powder form is put into a mold and heat-treated for sintering. However, a magnetic material may also be heat-treated together with resin (bond) for resin formation or compression formation.

The magnetic material formed in the ring shape is attached to the magnetic holding member 64 fixed to the rotor shaft 61 and is magnetized from the outer peripheral surface side in this state, thereby forming the permanent magnet 65. The permanent magnet 65 that has been magnetized becomes a segment magnet whose magnetic field is oriented from the inside toward the outside in a radial direction and which is divided according to the number of poles.

As a magnetic material of the permanent magnet 65, rare earth magnets are often used. Among the rare earth magnets, an Nd—Fe—B based bond magnet or an Sm—Fe—N based bond magnet that is an isotropic magnetic material may be used. In the present embodiment, however, an anisotropic magnet is used so that the sufficient magnetic force is obtained even if the rotor portion is reduced in size.

That is, as a magnetic material, an Sm—Co (samarium cobalt) based magnetic material that can generate a large amount of magnetic flux even if the thickness in a radial direction is small and that has large coercive force is used. In this case, when realizing the anisotropy using the Sm—Co based magnetic material, it is possible to generate a large amount of magnetic flux even if the thickness is small by performing magnetization after aligning the magnetic axis of the entire magnetic material by magnetic field orientation.

The permanent magnet 65 is formed so that the number of magnetic poles is 10 as shown in FIG. 6(a). In addition, the display of S and N shown in FIG. 6(a) is for displaying the pole facing the core winding 67, and the opposite side (on the center side) of each is an opposite pole.

The permanent magnet 65 is magnetized as follows using a magnetizing yoke 68a.

Figure 6B:
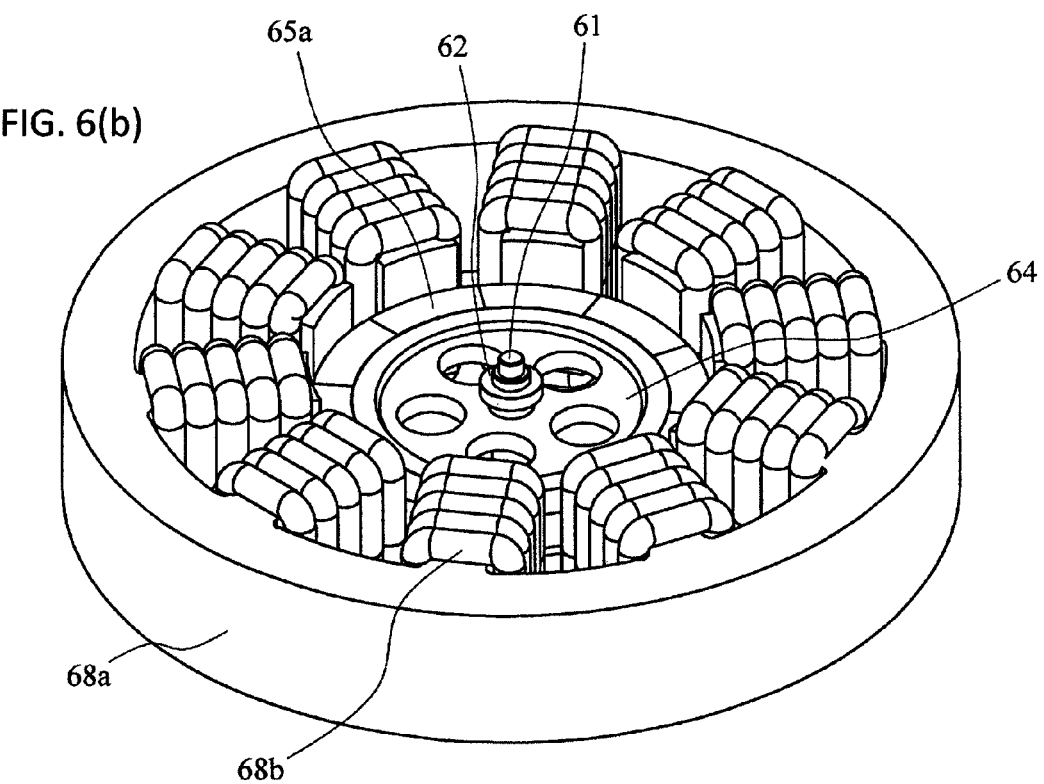

FIG. 6(b) is a perspective view showing a state in which a rotor portion is magnetized by the magnetizing yoke 68a.

As shown in FIG. 6(b), in the magnetizing yoke 68a, protruding portions of the same number as the number of poles (in the present embodiment, 10 poles) of the permanent magnets 65 are formed toward the center from the circular portion, and a magnetizing coil 68*b* is wound around the protruding portion in a thickness to withstand a large current.

The magnetizing yoke 68*a* is formed in a thickness of about four times the thickness of a magnetic material 65*b* in order to strongly magnetize (fully magnetize) the magnetic material 65*b* (permanent magnet 65).

A rotor portion in which the magnetic holding member 64 and a circular magnetic material (member that becomes the permanent magnet 65 after magnetization) 65*a* are fixed to the rotor shaft 61 is disposed inside the magnetizing yoke 68*a*. Accordingly, the magnetizing coils 68*b* are disposed opposite each other on the outer peripheral surface of the magnetic material 65*a*.

By making a large current flow through the magnetizing coil 68*b* in this state, the magnetic material 65*a* is fully magnetized. As a result, the permanent magnet 65 having 10poles whose magnetic field is oriented from the inside toward the outside in a radial direction is formed.

On the other hand, as shown in FIGS. 2 and 6(*a*), the stator core 66 that forms the stator portion is configured to include a ring-shaped stator core, such as the circular portion 66*a*, having inwardly protruding portions 66*b*.

As shown in FIG. 6(*a*), a plurality of protruding portions 66*b* are disposed toward the center from the inner peripheral surface of the circular portion 66*a*.

The protruding portions 66*b* are provided so as to match the predetermined number of poles. In the present embodiment, since the same number as the number of poles of the permanent magnet 65 is adopted as the predetermined number of poles, 10protruding portions 66*b* are provided to set the number of poles to 10.

The protruding portion 66*b* has a shape that extends toward the center from the circular portion 66*a* and also extends to both sides in the peripheral direction at its end. The distal end of the protruding portion 66*b* faces the outer peripheral surface of the permanent magnet 65 with a gap of a predetermined distance interposed therebetween. In addition, the core winding 67 is wound around the portion of the protruding portion 66*b*extending toward the center.

The diameter of the inner periphery (hereinafter, referred to as an inner diameter) of the stator core 66 formed at the tips of the 10 protruding portions 66*b* is selected in a range equal to or greater than 10 mm and equal to or less than 20 mm as a preferable size for miniaturizing the small power generator 1, and more preferably, selected in a range equal to or greater than 10 mm and equal to or less than 15mm.

On the other hand, the thickness of the stator core 66 is selected in a range equal to or greater than 0.8 mm and equal to or less than 1.4 mm.

In addition, as the number of poles n (the number of protruding portions 66*b* and the number of core windings 67) of the stator core 66, when the inner diameter of the stator core 66 is equal to or greater than 10 mm and equal to or less than 15 mm, 8 to 12 poles are preferably selected, and more preferably, 10 poles are selected. When the inner diameter is equal to or greater than 15 mm and equal to or less than 20 mm, 10 to 14 poles are preferably selected, and more preferably, 12 poles are selected.

In the present embodiment, the stator core 66 with 10poles which has an inner diameter of 13 mm, an outer diameter of 22 mm, and a thickness of 1 mm is used.

Here, the reason for selecting the number of poles in the stator core 66 will be described with reference to FIGS. 7 and 8.

FIG. 7 shows the shape of the stator core 66 when the number (the number of poles) of protruding portions 66*b* is changed.

In FIG. 7, the shapes of the stator cores 66 having 4poles, 6 poles, 8 poles, 10 poles, 12 poles, 14 poles, and 16poles are expressed by providing 4 to 16 slots in the respective stator cores 66.

In all of the stator cores 66, the inner diameter, the outer diameter, and the thickness (product thickness) are set to 13 mm, 22 mm, and 1 mm, respectively, in order to unify the conditions of power generation. In addition, the slot width (width between the distal ends of the adjacent protruding portions 66*b*) of each stator core 66 is set to be the same for all of the stator cores 66 since a predetermined width required for winding processing is needed.

Figures 8A, 8B:
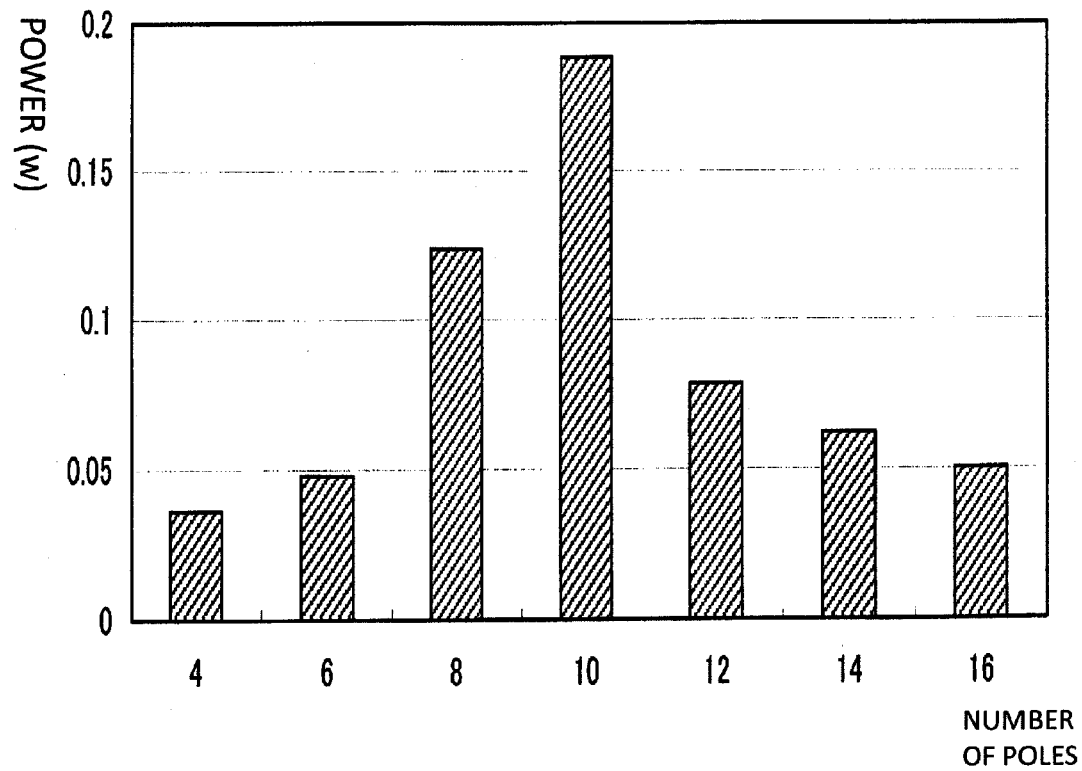
FIG. 8 is an explanatory diagram of the generated electric power when a stator core having each number of poles is used.

FIG. 8 shows the electric power generated when each stator core 66 shown in FIG. 7 is used.

FIG. 8 shows the electric power when winding is performed for the stator core 66 having each shape shown in FIG. 7 and a rotor having the same size is disposed inside each stator core 66 and is rotated at 5000 rpm.

Generally, it is possible to obtain high electric power as the number of poles increases. However, when the inner diameter of the stator core 66 is set to 13 mm by miniaturization, as shown in FIG. 8, electric power generated when the number of poles is 10 is the highest, electric power generated when the number of poles is 8 that is the very next lower number of 10 poles is the second highest, and electric power generated when the number of poles is 12 that is the very next higher number of 10 poles is the third highest.

Thus, the generated electric power is not necessarily increased in proportion to a simple increase in the number of poles, and the reason can be considered as follows.

That is, if the size of the stator core 66 is not taken into consideration, when the permanent magnet is rotated at the same speed, the speed of the magnetic flux interlinking the core winding 67 increases and accordingly the generated electric power increases as the number of magnetic poles of the magnet increases.

However, with the miniaturization of the stator core 66, the cross-sectional area (cross-sectional area of the core) of the core winding 67 decreases as the number of protruding portions 66*b* (the number of core poles) increases, and the magnetic flux is saturated. For this reason, the magnetic flux of the core winding 67 per cross-section decreases as the number of poles increases.

Therefore, when the small stator core 66 having an inner diameter of 10 mm to 20 mm is used, the number of poles that can be adopted according to the range of the inner diameter size and the optimal number of poles n are present.

Thus, in the inner rotor type power generator in which the inner diameter of the stator core 66 is equal to or greater than 10 mm and equal to or less than 20 mm, it can be seen that the electric power generated in the case of the optimal number of poles n is the highest, the generated electric power decreases as the number of poles decreases from n, and the generated electric power decreases as the number of poles increases even if the number of poles is larger than n.

The optimal number of poles n is determined by the inner diameter of the stator core 66. When the inner diameter is equal to or greater than 10 mm and equal to or less than 15 mm, n=10. In this case, power generation that can withstand practical use is obtained in the range of the number of poles of 8 to 12.

On the other hand, when the inner diameter is equal to or greater than 15 mm and equal to or less than 20 mm, n=12.

In this case, power generation that can withstand practical use is obtained in the range of the number of poles of 10 to 14.

The stator core 66 is manufactured by laminating and fixing a plurality of thin plates each of which has a shape in which the circular portion 66a and the protruding portion 66b are integrally formed and is insulated by an insulation coating or the like. Specifically, the stator core 66 is formed of a laminated silicon steel plate.

In addition, various materials and shapes in the inner rotor type power generator can be adopted for the stator core 66. For example, the protruding portion 66b manufactured separately may be fixed to the circular portion 66a.

The core winding 67 is wound in series around each protruding portion 66b.

In the present embodiment, a structure is adopted in which the stator core 66 is disposed on the outer periphery of the inner rotor. Therefore, since a plurality of core windings 67 can be radially disposed inside the circular portion 66a, it is possible to increase the coil winding length (the length of the winding) while reducing the size of each core winding 67. As a result, it is possible to generate a large amount of electric power.

As shown in FIG. 5(a), the substrate 69 that forms a stator portion passes through the through recess 22a from the outside of the housing unit 2, and is disposed on the two core windings 67.

Two wiring lines are provided by printing or the like on the substrate 69, and both ends of the core winding 67 wound in series are connected to two wiring lines so that the electric power generated by the power generation unit 6 is extracted to the outside.

When the small power generator 1 is built into a portable electronic apparatus, such as a mobile phone, a side (not shown) of the substrate 69 is connected to a secondary battery or a spare power supply (a secondary battery, a large-capacity capacitor, or the like) of the portable electronic apparatus.

In addition, when the small power generator 1 is used as a spare external power supply, wiring lines including a terminal connected to various apparatuses may also be used instead of the substrate 69.

The assembly procedure of the small power generator 1 configured as described above will be described below.

(1) First, fix the three struts 41 to the base 21.

(2) Then, dispose the stator core 66 of the power generation unit 6 in the base step portion 21c of the base 21. In this case, perform positioning such that the substrate 69 attached to the stator core 66 matches the through recess 22a of the intermediate plate 22.

(3) In addition, pivotally support the lower end of the rotor shaft 61, to which the permanent magnet 65 and the magnetic holding member 64 are fixed, on the base 21 by the oil-retaining bearing 63a.

(4) Then, pivotally support the transmission shaft 51 on the base 21 by the oil-retaining bearing 52, and make the driven gear 62 of the rotor shaft 61 mesh with the second intermediate gear 54.

(5) Then, pivotally support the upper end of the rotor shaft 61 on the receiving plate 42, to which the dial shaft 32 is fixed, by the oil-retaining bearing 63b, pivotally support the upper portion of the transmission shaft 51 by the oil-retaining bearing 53, and fix the receiving plate 42 to the strut 41 using the screw 43.

(6) Then, attach the first intermediate gear 55 to the transmission shaft 51 from the upper side of the receiving plate 42.

(7) Then, place the intermediate plate 22 on the base 21. In this state, the substrate 69 comes to the outside from the through recess 22a.

(8) Then, place the rotary dial 31 on the intermediate plate 22, and pivotally support the rotary dial 31 on the dial shaft 32.

(9) Finally, place the cover 23 on the intermediate plate 22, and screw the four corners of the base 21, the intermediate plate 22, and the cover 23 using the screw 24.

The operation of power generation by the small power generator 1 configured as described above will be described below.

When generating the electric power, the user puts his or her finger on the rotary dial protrusion 33 to rotate the rotary dial 31.

When the rotary dial 31 is rotated, the rotation is transmitted to the transmission shaft 51 through the first intermediate gear 55 meshing with the driving gear 35. The rotation of the transmission shaft 51 is further transmitted to the rotor shaft 61 through the driven gear 62 meshing with the second intermediate gear 54, thereby rotating the permanent magnet 65.

Thus, by the rotation of the rotary dial 31, the rotational speed is increased by the gear ratio of the gears and the permanent magnet 65 of the rotor portion is rotated (range of 3000 rpm to 7000 rpm). Therefore, it is possible to supply a voltage of 3 V to 5 V and a sufficient current for charging.

The electric power generated by the power generation unit 6 charges the power supply through wiring lines of the substrate 69.

Next, a second embodiment in the small power generator 1 will be described.

In the small power generator 1 of the second embodiment, the transmission path of the rotational power of the rotary dial 31 is different from that in the first embodiment. That is, all of the driving gear 35, the first intermediate gear 55, the second intermediate gear 54, and the driven gear 62 that form a two-stage gear mechanism are formed using spur gears in the first embodiment described above, but an internal gear is provided in the rotary dial 31 in the second embodiment.

Hereinafter, details of the second embodiment will be described focusing on the differences from the first embodiment with reference to FIGS. 9 and 10.

In the small power generator 1, a circular recess around the dial shaft 32 is provided inside a rotary dial 31b so that a peripheral wall portion 38 is formed on the entire surface of the outer periphery, and a drive internal gear 35b is formed on the inner peripheral surface of the peripheral wall portion 38. The peripheral wall portion 38 is disposed in a circular hole of the intermediate plate 22.

In addition, a circular engaging portion 36b is formed over the entire outer periphery of the peripheral wall portion 38, and the bottom surface of the circular engaging portion 36b slides on the intermediate plate 22. Thus, the outer peripheral portion of the rotary dial 31b is supported.

An intermediate gear 54b to directly transmit the rotation from the drive internal gear 35b of the rotary dial 31b to the driven gear 62 of the rotor shaft 61 is formed on the transmission shaft 51 of the second embodiment.

That is, the intermediate gear 54b formed on the transmission shaft 51 meshes with the drive internal gear 35b formed inside the peripheral wall portion 38 of the rotary dial 31b and meshes with the driven gear 62 formed on the rotor shaft 61, thereby functioning as an idle gear.

Figure 9:
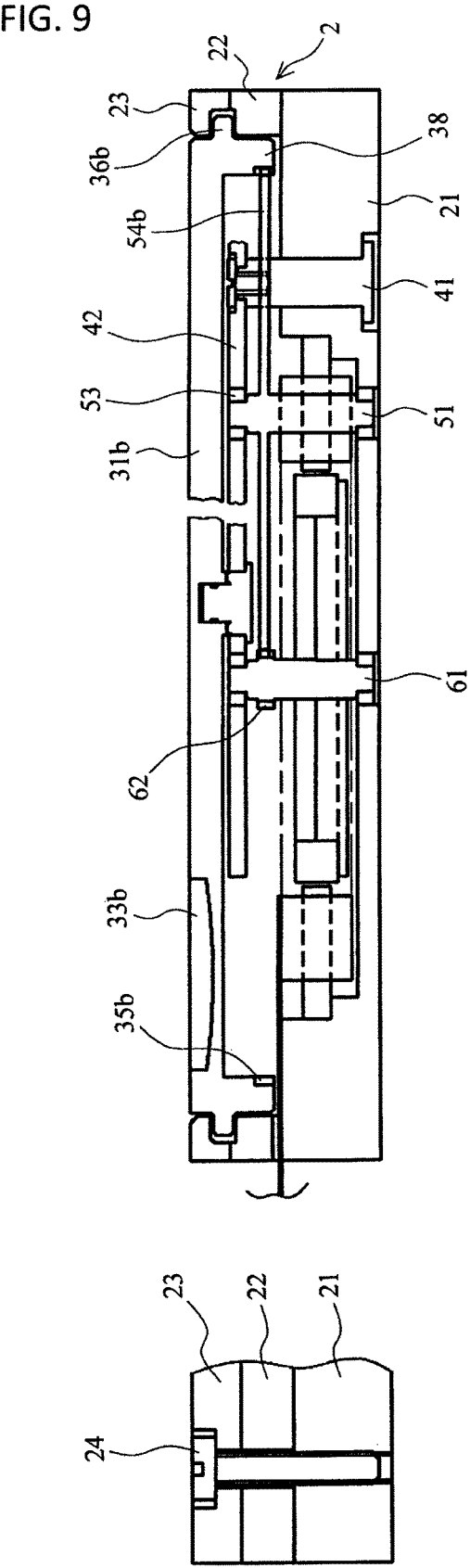
FIG. 9 is a cross-sectional view of a small power generator in a second embodiment.

As shown in FIGS. 9 and 10, also in the second embodiment, the transmission shaft 51 of the intermediate gear 54b is provided inside the stator core 66 (outside the rotor portion), specifically, between the core windings 67 of the stator core 66 in order to reduce the planar size of the small power generator 1.

In addition, also in the second embodiment, as shown in FIG. 10, all of the receiving unit 4, the transmission unit 5, and the power generation unit 6 except for a part of the substrate 69 are formed within the maximum diameter of the rotary dial 31b.

In addition, an end of the transmission shaft 51 of the second embodiment is pivotally supported on the receiving plate 42 by the oil-retaining bearing 53.

Thus, in the second embodiment, it is possible to make the rotary dial 31b thin since the first intermediate gear 55 is not necessary, unlike the first embodiment in which the end of the transmission shaft 51 penetrates from the receiving plate 42 and the first intermediate gear 55 is fixed to the end. As a result, it is possible to reduce the overall thickness of the small power generator 1.

In addition, in the first embodiment, a plurality of rotary dial protrusions 33 arranged radially with the dial shaft 32 as the center are provided as a structure to assist the rotation operation when rotating the rotary dial 31. In the second embodiment, however, a rotary dial recess 33b is adopted.

In the rotary dial recess 33b, a circular recess is provided in one rotary dial 31b, and the user puts his or her finger on the recess to rotate the rotary dial 31b.

In addition, in the rotary dial 31 in the first embodiment, it is possible to adopt the rotary dial 31 instead of the rotary dial protrusion 33. In addition, conversely, the rotary dial protrusion 33 of the first embodiment may be adopted in the rotary dial 31b of the second embodiment.

Next, modifications of the first and second embodiments will be described with reference to FIGS. 11 to 13.

In these modifications, the shape of the receiving unit 4 of the small power generator 1 is changed. Although the following explanation will be given with the first embodiment as an example, this can also be similarly applied to the second embodiment described above.

In the small power generator 1 of both the embodiments described above, as shown in FIG. 4(b), three shafts of the dial shaft 32, the rotor shaft 61, and the transmission shaft 51 are pivotally supported on the receiving plate 42, and all struts 41 for fixing the receiving plate 42 to the base 21 are disposed outside the stator core 66.

In first to third modifications of these modifications, at least one strut 41 of the plurality of struts 41 is disposed inside the stator core 66 (outside the rotor portion) and is fixed to the base 21.

In addition, although the arrangement of the dial shaft 32, the rotor shaft 61, and the transmission shaft 51 in each modification is the same as in the first and second embodiments, the dial shaft 32, the rotor shaft 61, and the transmission shaft 51 may be disposed at different positions. However, the transmission shaft 51 is disposed in the stator core 66 for the miniaturization of the small power generator 1.

Figure 11A:
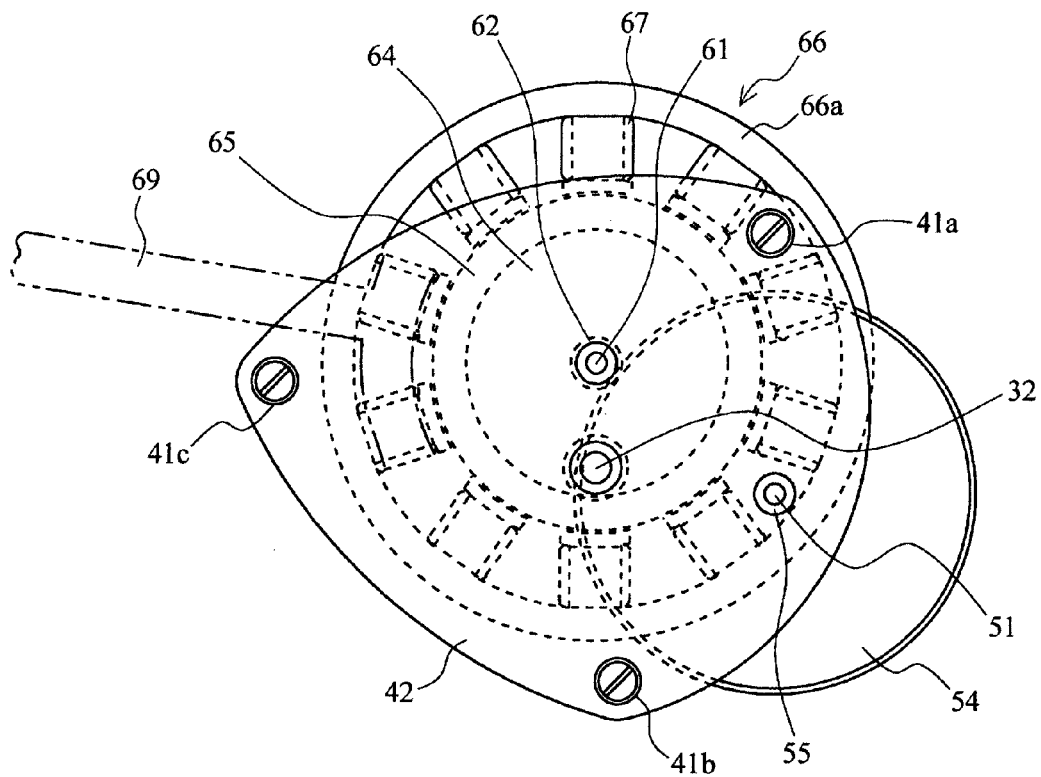
FIG. 11 is an explanatory diagram of first and second modifications regarding a receiving plate of the small power generator.

In the first modification, as shown in FIG. 11(a), one of three struts 41a is disposed between the core windings 67. In the example shown in FIG. 11(a), a strut 41c is disposed at the same position as in the first embodiment. However, a strut 41b is disposed outside the stator core 66 but disposed closer to the stator core 66 than in the first embodiment.

Thus, by disposing the strut 41a of the plurality of struts 41a to 41c in the stator core 66, the receiving plate 42 can be made small. Accordingly, it is possible to reduce the weight. In addition, it is also possible to reduce the planar size of the small power generator 1.

Figure 11B:
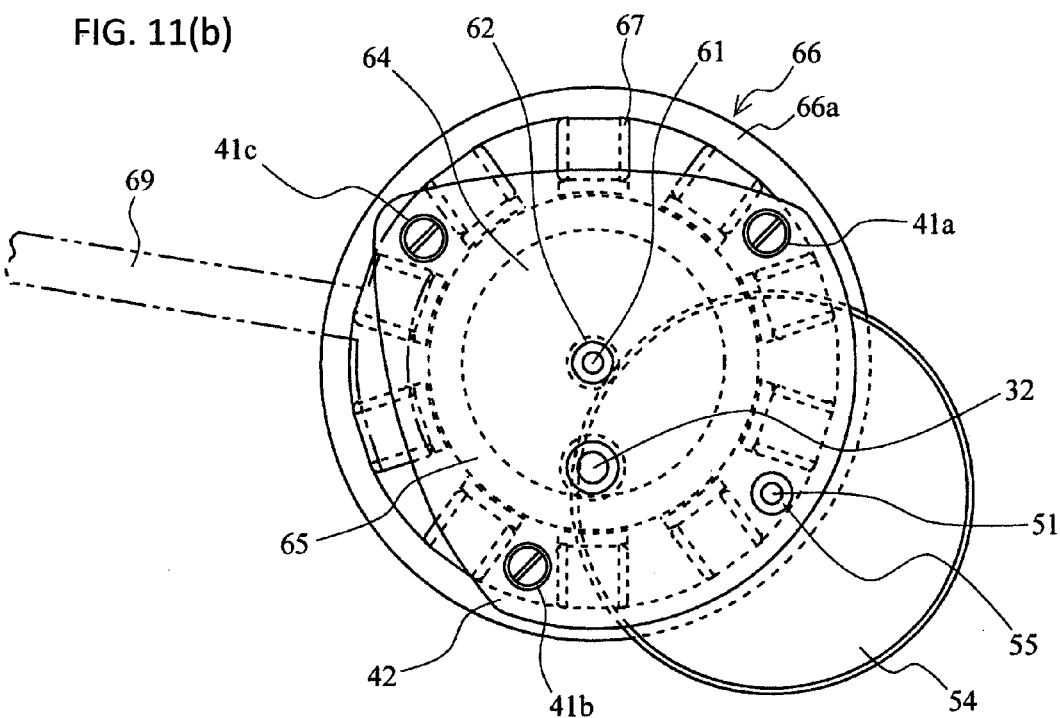

In the second modification, as shown in FIG. 11(b), all struts 41a to 41c are disposed inside the stator core 66.

Accordingly, a total of four of the three struts 41a to 41c and the transmission shaft 51 are disposed in the stator core 66.

In addition, in the second modification, among a total of 10 core windings 67, three core windings 67 are disposed between the struts 41a and 41c, three core windings 67 are disposed between the struts 41b and 41c, and four core windings 67 are disposed between the struts 41a and 41b. Accordingly, it is possible to support the receiving plate 42 with good balance. In addition, in order to improve the balance of the transmission shaft 51 with respect to the struts 41a and 41b, two core windings 67 are placed between the struts 41a and 41b, and the transmission shaft 51 is disposed therebetween.

In addition, in the second modification, the receiving plate 42 can be placed within the outer peripheral surface of the stator core 66 by disposing all of the three struts 41a to 41c in the stator core 66.

Next, a third modification will be described with reference to FIG. 12.

Also in the third modification, all of the three struts 41a to 41c are disposed between the core windings 67.

In the third modification, the strut 41 is disposed between the core windings 67 by increasing the diameter of the stator core 66. Thus, by enlarging the stator core 66, it is possible to further increase the number of windings and to obtain a high voltage.

In addition, for the winding method of the core winding 67, the case of series winding has been described. In the third modification, however, since the protruding portion 66b can be made long, it is also possible to adopt a configuration of overlap winding.

In the first and second embodiments and the first and second modifications, the case has been described in which the rotating unit 3, the receiving unit 4, and the transmission unit 5 are disposed within the outer peripheral surface of the rotary dial 31 except for apart of the substrate 69. However, as shown in the third modification, it is possible to adopt a structure in which a part of the stator core 66 protrudes from the outer peripheral surface of the rotary dial 31.

Thus, when a structure is adopted in which the stator core 66 protrudes to the outside of the rotary dial 31, it is possible to realize the same size as the small power generator 1 in the first embodiment by matching a virtual line segment connecting the axes of both with the diagonal line of the housing unit 2. That is, it is possible to avoid an increase in the overall size by enlarging the stator core 66 such that the stator core 66 does not protrude in the apex direction of the housing unit 2.

Figure 12:
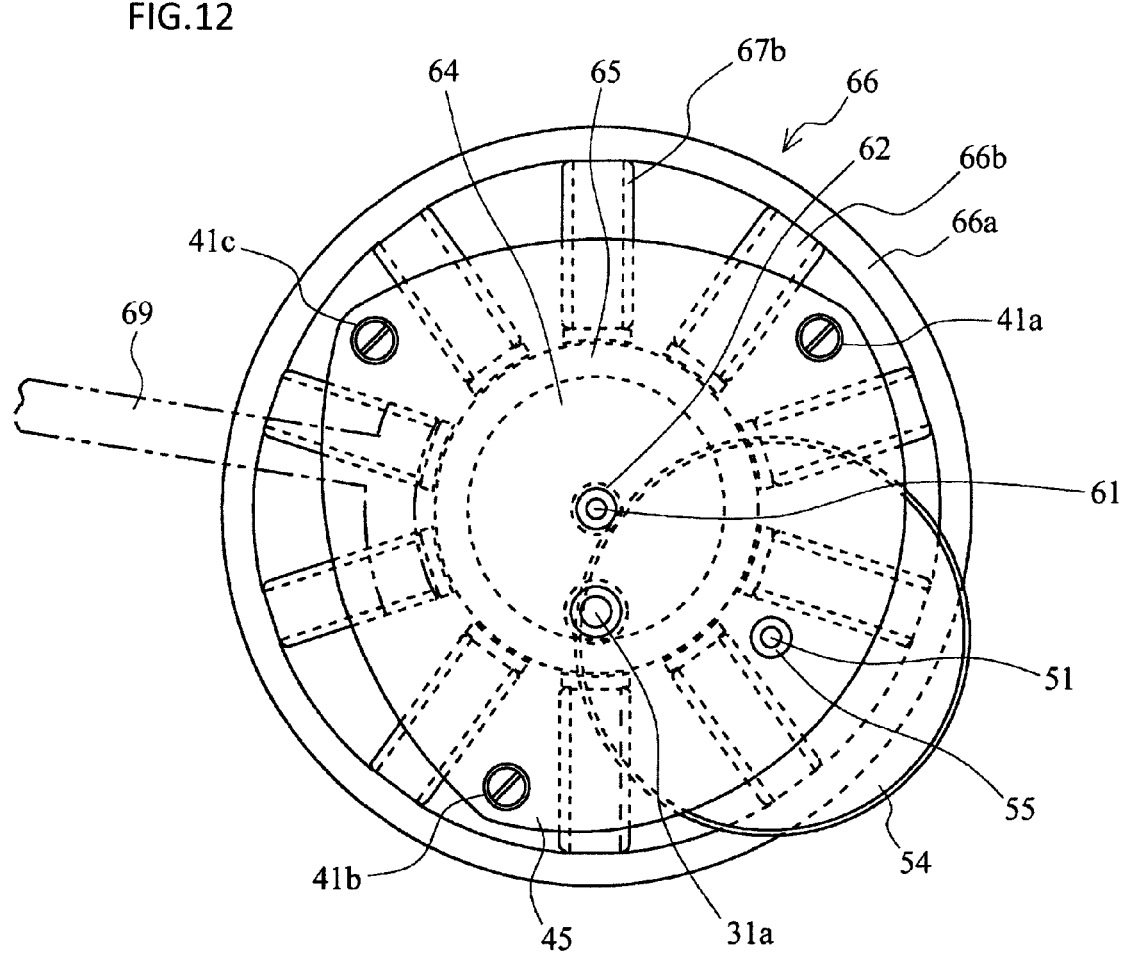
FIG. 12 is an explanatory diagram of a third modification regarding the receiving plate of the small power generator.

In addition, although the case where all struts 41a to 41c are disposed between the core windings 67 has been described in the modification shown in FIG. 12, it is possible to adopt a configuration in which one of the struts 41a to 41c is disposed between the core windings 67.

Although the case where at least one strut 41 is disposed between the core windings 67 has been described in the first to third modifications described above, at least one strut 41 may be disposed on the circular portion 66a.

In this case, the strut 41 may be fixed to the circular portion 66a itself, or the strut 41 may pass through the circular portion 66a and the base 21 to be fixed.

Next, a fourth modification will be described with reference to FIG. 13.

In the first embodiment and the modifications described above, a configuration is adopted in which the strut 41 is fixed to the base 21 and the receiving plate 42 is fixed to the strut 41 on the inside of the intermediate plate 22. On the other hand, in the fourth modification, the strut 41 is eliminated, and the receiving plate 42 is supported and fixed by the housing unit 2.

Also in the fourth modification, the support positions of the dial shaft 32, the rotor shaft 61, and the transmission shaft 51 are the same as in the first embodiment.

Figure 13:
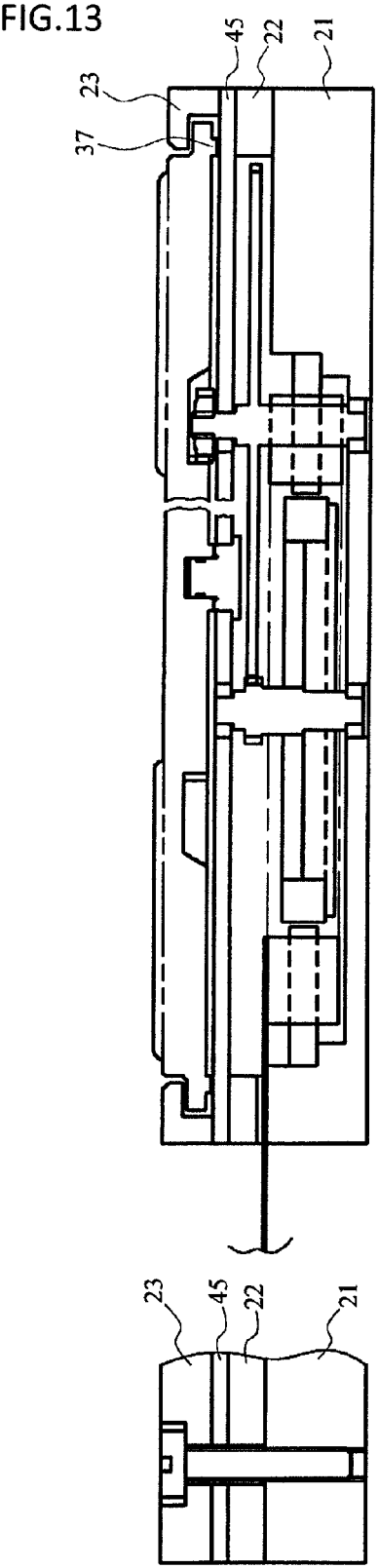
FIG. 13 is an explanatory diagram of a fourth modification regarding the receiving plate of the small power generator.

In the fourth modification, as shown in FIG. 13, the outer shape of a receiving plate 45 is the same as the outer shape of the housing unit 2, and the receiving plate 45 is disposed between the intermediate plate 22 and the cover 23. Screw holes are formed at four corners of the receiving plate 45 in the same manner as in the housing unit 2, and the receiving plate 45 is fixed together with the housing unit 2 by the screws 24.

Thus, in the fourth modification, since there is no strut 41, it is possible to reduce the number of manufacturing components. Therefore, it is possible to simplify the manufacturing process.

In the fourth modification, the sliding protrusion 37 of the rotary dial 31 slides on the surface of the receiving plate 45.

In addition, although the area of the outer shape of the receiving plate 45 becomes large compared with the receiving plate 42 described in the first embodiment or the modifications, a through hole may be provided in the receiving plate 45 (inside is cut) within the range not causing problems to the strength to support the dial shaft 32, the strut 41, and the rotor shaft 61.

In addition, it is also possible to use the receiving plate 45 configured to include a central support plate portion of the area including the dial shaft 32, the strut 41, and the rotor shaft 61, a circular portion whose shape in plan view is approximately the same as the intermediate plate 22, and a connecting portion that connects the central support plate portion and the circular portion at three or more locations.

For example, it is possible to adopt a structure in which the shape of the central support plate portion of the receiving plate 45 is the same as the shape of the receiving plate 42 shown in FIG. 4(*b*) and the central support plate portion is connected to the circular portion by three connecting portions extending from the central support plate portion in a direction of the line segment connecting the screw 43 from the axis of the rotary dial 31.

In addition, in the fourth modification shown in FIG. 13, the small power generator 1 having the same thickness as in the first embodiment or the modifications described above is formed by reducing the thickness of the intermediate plate 22 by the thickness of the receiving plate 45.

On the other hand, the intermediate plate 22 and the receiving plate 45 may be integrally formed.

In addition, it is also possible to eliminate the intermediate plate 22, form the base 21 in a thickness including the intermediate plate 22, and form the first recess 21*a* so as to be deep by the thickness.

According to the embodiments and the modifications described above, the following effects can be obtained.

(1) The plurality of core windings 67 disposed in a circular shape, the permanent magnet 65 disposed on the inner periphery of the core windings 67, and a gear train for rotating the permanent magnet 65 are provided, and the rotary shaft (transmission shaft 51) of at least one gear of the gear train is disposed between the plurality of core windings 67 disposed as described above. Thus, it is possible to reduce the planar size by disposing the rotary shaft of the gear between the core windings 67.

(2) In addition, by disposing the plurality of core windings 67 radially in the circular ring, it is possible to increase the overall coil winding length while reducing the size of each core winding 67. As a result, it is possible to generate a large amount of electric power.

(3) Since the axis of the rotary dial 31 and the axis of the rotor portion in the power generation unit 6 are not the same, holding members (the dial shaft 32 and the oil-retaining bearing 63*a*) used in rotation support portions of the rotary dial 31 and the rotor portion are shifted from each other in a plane. Therefore, since it is possible to avoid any interference in the thickness direction, it is possible to reduce the thickness.

(4) In addition, in the case of an outer rotor type power generation unit, the apparatus becomes thick since a magnetic holding member (rotor bottom) that holds a permanent magnet is disposed above/below the stator. In the present embodiment, however, since the permanent magnet 65 and the magnetic holding member 64 can be disposed inside the stator core 66 by adopting the inner rotor type, it is possible to reduce the thickness of the apparatus.

(5) In addition, in the embodiments and the modifications described above except for the fourth modification, the dial shaft 32 of the driving gear 35 and the rotor shaft 61 of the driven gear 62 are disposed within the triangle connecting the three struts 41. Therefore, both shafts can be stably supported by the receiving plate 42.

(6) In the case of the outer rotor type power generator, it is necessary to perform magnetization from the inside of the radially anisotropic magnet molded in a ring shape. However, in the case of a small diameter, it is difficult to dispose a magnetization yoke inside the magnet. For this reason, it is difficult to use an anisotropic magnet with strong magnetic force.

However, in the inner rotor structure of the present embodiment, since a magnetically oriented split magnet is attached and fixed to the rotor and then the magnetizing yoke 68*a* is disposed on the outer periphery, magnetization is easily performed. Therefore, since full magnetization is possible, it is possible to obtain a large amount of electric power by using an anisotropic magnet with strong magnetic force.

While the embodiments and the modifications in the small power generator of the present invention have been described, the present invention is not limited to those described above, and various modifications can be made within the scope as set forth in the claims.

For example, although the through recess 22*a* for the substrate 69 is provided in the intermediate plate 22 in the embodiments described above, it is also possible to form the intermediate plate 22 as a circular flat plate and provide a through recess on the upper surface of the base 21. In this case, since the stator core 66 in which the substrate 69 is disposed is attached to the base 21, the positioning of the substrate 69 becomes easy.

In addition, although the configuration in which three struts 41 are provided has been adopted in the embodiments described above, four or more struts 41 may be provided.

In addition, although the case where the rotary dial protrusion 33 is provided in the rotary dial 31 has been described in the first embodiment and the case where the rotary dial recess 33*b* is provided in the rotary dial 31 has been described in the second embodiment, it is also possible to provide a polygonal hole on the surface of the rotary dial 31 and insert a lever into the polygonal hole and turn it. In this case, the rotary dial 31 can be rotated with a small force by providing the polygonal hole on the outer peripheral side as possible of the rotary dial 31. In addition, a plurality of polygonal holes may be provided at different positions in a radial direction (positions where the distances from the center of rotation are different), so that it can be selected according to the preferences of the user whether to turn the rotary dial 31 on a large circle with a small force by inserting the lever into a polygonal hole on the outer side or to turn the rotary dial 31 on a small circle with a large force by inserting the lever into a polygonal hole on the central side.

In addition, although the case where a shaft hole is formed in the rotary dial 31 and the dial shaft 32 fits into the shaft hole has been described in the embodiments in which the rotary dial 31 is described as a rotation support portion, a shaft may be made to protrude from the rotary dial 31 and the shaft may be inserted into shaft holes provided in the receiving plates 42 and 45. In this case, an oil-retaining bearing may be provided in the shaft holes.

REFERENCE SIGNS LIST

1: small power generator
2: housing unit
21: base
21*a*: first recess
21*b*: second recess
21*c*: base step portion
22: intermediate plate
22*a*: through recess
23: cover
23*a*: recess
23*b*: dial hole
23*c*: pressing portion
24: screw
3: rotating unit
31, 31*b*: rotary dial
32: dial shaft
33: rotary dial protrusion
33*b*: rotary dial recess
34: circular recess
35: driving gear
35*b*: drive internal gear
36, 36*b*: circular engaging portion
37: sliding protrusion
38: peripheral wall portion
4: receiving unit
41: strut
42: receiving plate
43: screw
45: receiving plate
5: transmission unit
51: transmission shaft
52, 53: oil-retaining bearing
54: second intermediate gear
54*b*: intermediate gear
55: first intermediate gear
6: power-generation unit
61: rotor shaft
62: driven gear
63*a*, 63*b*: oil-retaining bearing
64: magnetic holding member
65: permanent magnet
66: stator core
66*a*: circular portion
66*b*: protruding portion
66*c*: cutout portion
67: core winding
68*a*: magnetizing yoke
68*b*: magnetizing coil
69: substrate
100: portable electronic apparatus
101: housing

The invention claimed is:

1. An inner rotor type small power generator for generating power, comprising:
   a stator having a plurality of core windings;
   a rotor disposed inside of the stator, the rotor having a rotor shaft on which a driven gear is disposed and a circular permanent magnet;
   a rotary unit configured to be rotated by a user at the time of power generation by the power generator, the rotary unit having a driving gear that undergoes rotation during rotation of the rotary unit; and
   a transmission unit that transmits rotation of the driving gear to the driven gear of the rotor shaft through an intermediate gear, at least one rotary shaft of the intermediate gear being disposed outside the rotor and being rotatably disposed inside the stator at a location in between the core windings of the stator.

2. The power generator according to claim 1, wherein the stator comprises a circular stator.

3. The power generator according to claim 1, further comprising a receiving plate disposed between the rotary unit and the stator; wherein a rotary shaft of the driving gear, the at least one rotary shaft of the intermediate gear, and the rotor shaft are supported on the receiving plate.

4. The power generator according to claim 3, wherein the rotary unit has a manually rotatable rotary dial disposed in parallel with the stator, the rotary dial having a circular recess formed concentrically with the driving gear; and wherein the driving gear comprises an external gear formed on an inner peripheral surface of an inner side of the circular recess.

5. The power generator according to claim 4, wherein the stator, the rotor, and the transmission unit are disposed inwardly of an outer diameter of the rotary dial.

6. The power generator according to claim 3, wherein the rotary unit has a manually rotatable rotary dial disposed in parallel with the stator, the rotary dial having a circular recess formed concentrically with the driving gear; and wherein the driving gear comprises an internal gear formed on the circular recess.

7. The power generator according to claim 6, wherein the stator, the rotor, and the transmission unit are disposed inwardly of an outer diameter of the rotary dial.

8. A portable electronic apparatus, comprising:
   the power generator according to claim 1; and
   storage means for storing electric power generated by the power generator.

9. A power generator comprising:
   a power generation unit for generating electric power and comprised of a stator having a ring-shaped stator core with inwardly extending portions on which are wound core windings, and a rotor rotatably disposed inside the ring-shaped stator core, the rotor having a rotor shaft and a driven gear disposed on the rotor shaft and configured to be driven to rotate the rotor shaft;
   a rotary unit having a driving gear mounted to undergo rotational movement to rotate the rotor shaft via the driven gear to generate electric power; and
   a power transmission unit having an intermediate gear for transmitting a rotational force of the driving gear of the rotary unit to the driven gear of the rotor shaft, the intermediate gear having a rotary shaft rotatably disposed inside of the ring-shaped stator core at a location in between two of the core windings.

10. The power generator according to claim 9, wherein the rotary unit has a rotary dial configured to be manually rotated by a user to rotate the driving gear; and wherein the stator and the rotor of the power generation unit and the transmission unit are disposed inwardly of an outer periphery of the rotary dial.

11. The power generator according to claim 10, wherein the rotary dial is mounted to undergo rotation about a dial shaft; and wherein the dial shaft and the rotor shaft are spaced apart from one another so that the rotary dial and the rotor, respectively, undergo rotation about different rotational axes.

12. A portable electronic apparatus, comprising:
    the power generator according to claim 9; and
    a storage device that stores electric power generated by the power generator.

13. The power generator according to claim 9, wherein the rotary shaft of the intermediate gear extends completely through the ring-shaped stator core.

14. The power generator according to claim 9, further comprising a housing unit in which the power generation unit, the rotary unit and the power tansmission unit are disposed, the rotary unit being accessible from outside the housing unit to enable manual rotation thereof by a user to rotate the rotor shaft, and the rotary shaft of the intermediate gear and the rotor shaft of the rotor being rotatably supported on a base of the housing unit.

15. The power generator according to claim 14, wherein the rotary unit has a rotary dial configured to be manually rotated by a user to rotate the rotor shaft; and further comprising a plate which is disposed beneath the rotary dial and which rotatably supports the rotary shaft and the rotor shaft.

16. The power generator according to claim 15, wherein the rotary unit has a dial shaft fixed to the plate and rotatably supporting the rotary dial at its center.

17. The power generator according to claim 16, wherein the rotary dial has on a perpheral bottom portion thereof a sliding protrusion in sliding contact with an inner surface portion of the housing unit to rotatably support the outer periphery of the rotary dial.

* * * * *